(12) United States Patent
Aranguren et al.

(10) Patent No.: US 7,890,675 B2
(45) Date of Patent: Feb. 15, 2011

(54) APPARATUS, SYSTEM, AND METHOD FOR REAL TIME JOB-SPECIFIC BUFFER ALLOCATION

(75) Inventors: Herman Aranguren, Tucson, AZ (US); David Bruce LeGendre, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 12/398,928

(22) Filed: Mar. 5, 2009

(65) Prior Publication Data

US 2010/0228898 A1 Sep. 9, 2010

(51) Int. Cl.
G06F 3/00 (2006.01)
G06F 13/00 (2006.01)

(52) U.S. Cl. .................................. 710/56; 711/137
(58) Field of Classification Search .............. 710/52, 710/56; 711/137
See application file for complete search history.

(56) References Cited

U.S. PATENT DOCUMENTS

| 5,623,608 | A  | * | 4/1997 | Ng .............................. 711/137 |
| 6,618,719 | B1 | * | 9/2003 | Andrei ............................... 1/1 |
| 6,801,883 | B1 |   | 10/2004 | Hurlock |
| 2006/0106785 | A1 | * | 5/2006 | Bobbitt et al. .................. 707/4 |
| 2007/0244940 | A1 | * | 10/2007 | Devarakonda et al. ....... 707/205 |

OTHER PUBLICATIONS

Synchronous Pair Block Recording, Sep. 1982, IBM Techical Disclosure Bulletin, NN82092053.*
Hammami et al., "Cache memories, fuzzy localities and fuzzy working sets" Proceedings of the Fifth IEEE International Conference on Fuzzy Systems, 1996., Sep. 8-11, 1996, vol. 1, On pp. 535-540 vol. 1.
Hammami et al., "Pipeline integration of neuro and fuzzy cache management techniques", Proceedings of the Sixth IEEE International Conference on Fuzzy systems, Jul. 1-5, 1997, vol. 2, On pp. 653-658 vol. 2, Meeting Date: Jul. 1, 1997-Jul. 5, 1997, Barcelona, Spain.
Lovelace et al., "VSAM Demystified", IBM Redbooks, Sep. 2003.
Z/OS Concepts, z/OS Basic Skills Information Center, IBM, Sep. 2007.

* cited by examiner

*Primary Examiner*—Henry W Tsai
*Assistant Examiner*—Hyun Nam
(74) *Attorney, Agent, or Firm*—Kunzler Needham Massey & Thorpe (57) ABSTRACT

An apparatus, system, and method are disclosed for dynamically allocating buffers during the execution of a job. A plan module sets a buffer allocation plan for the job using data access history that contains information about the number and nature of data access events in past executions of the same job. A buffer module allocates buffers during the execution of the job, and alters the buffer allocation to improve performance for direct access events for those portions of the job that the buffer allocation plan indicates have historically included predominantly direct access events. The buffer module alters the buffer allocation to improve performance for sequential access events for those portions of the job that the buffer allocation plan indicates have historically included predominantly sequential access events. A history module then collects data access information about the current execution and adds that information to the data access history.

20 Claims, 7 Drawing Sheets

APPARATUS, SYSTEM, AND METHOD FOR REAL TIME JOB-SPECIFIC BUFFER ALLOCATION

BACKGROUND OF THE INVENTION

1. Field of the Invention

This invention relates to allocating buffers for data retrieval operations.

2. Description of the Related Art

Buffers are often used in connection with input/output ("I/O") operations to hardware. For example, as a device reads data from a hard disk, it is often read into buffers. Using buffers instead of reading and writing data directly from/to the disk offers significant performance advantages. However, there are limits on the use of buffers; for example, a system may have a limited amount of buffers available. In addition, other jobs on a particular system may be competing for buffers and other resources. Allocating too many buffers for a particular job takes resources away from other jobs and is inefficient. In addition, using too many buffers may result in unnecessary paging and internal processing. However, allocating too few buffers requires that the job get more data from the disk and imposes a performance penalty.

In addition, how data is accessed can be an important factor in buffer allocation. For example, Virtual Storage Access Method ("VSAM") is an IBM disk file storage access method in z/OS for data in direct access storage devices ("DASD") such as disk drives. VSAM provides for direct access that allows a particular record to be accessed using a search argument. using a search argument. For example, a bank record may be accessed using a bank account number. VSAM also provides for sequential access that processes (for read or write) one logical record after the other. For example, if an application is totaling the amount of money stored in all bank records, it may trigger sequential access events to simply get one record after the other since it does not need to uniquely identify or access bank records in any particular order.

A VSAM record has an index component and a data component. To facilitate reading VSAM records quickly, a data buffer stores the data component and an index buffer stores the index component. Thus, in addition to allocating the buffers that will be available to a particular job, a process managing buffers must also determine how many index buffers to allocate and how many data buffers to allocate. Misallocating buffer types for the job can result in sub-par performance. Proper allocation of buffer types can be particularly troublesome where the job executes both sequential access events and direct access events, since optimizing for one type of data request imposes costs when the other type is being executed in the job.

SUMMARY OF THE INVENTION

The present invention has been developed in response to the present state of the art, and in particular, in response to the problems and needs in the art that have not yet been fully solved by currently available apparatus, systems and methods for allocating buffers. Accordingly, the present invention has been developed to provide an apparatus, system, and method for allocating buffers that overcome many or all of the above-discussed shortcomings in the art.

The apparatus for buffer allocation is provided with a plurality of modules configured to functionally execute the steps of allocating buffers during the execution of a job. These modules in the described embodiments include a plan module, a buffer module, and a history module. The plan module is configured to set a buffer allocation plan for a job using a data access history about previous executions of the job. The plan module may set the buffer allocation plan by creating a new buffer allocation plan. The plan module may also set the buffer allocation plan by adjusting an existing buffer allocation plan. The data access history may include the number of direct access events and how they are distributed through the job, and a number of sequential access events and how they are distributed through the job.

The buffer module allocates buffers during the execution of the job according to the buffer allocation plan. In certain embodiments, the buffer module allocates buffers to improve direct access performance for those portions of the job that the buffer allocation plan identifies as direct access portions. Allocating buffers to improve direct access performance may include increasing the number of index buffers. The buffer module allocates buffers to improve sequential access performance for those portions of the job that the buffer allocation plan identifies as sequential access portions. Allocating buffers to improve sequential access performance may involve increasing the number of data buffers. The history module collects data access information for the current execution of the job and stores the data access information in the data access history.

The buffer allocation plan may include direct access portions and sequential access portions. In one embodiment, direct access portions are those segments of the job that historically have a ratio of direct access events to other access events that is above a predefined threshold value. Similarly, sequential access portions may be those segments of the job that historically have a ratio of sequential access events to other access events that is above a predefined threshold value.

The apparatus may also include a monitor module that monitors the current execution of the job while it executes and that adjusts buffers during execution of the job. In one embodiment, the monitor module makes the adjustments if it determines that the actual data execution pattern for the job differs significantly from the data execution pattern for previous executions of that job.

In one embodiment, the apparatus also includes an identification module that identifies job that may not benefit from additional setting of the buffer allocation plan. The identification module identifies those jobs that have sequential access events above a threshold value. The identification module directs the plan module to stop setting the buffer allocation plan for future executions of the identified jobs and also directs the history module to stop collecting data access information for future executions of the identified jobs. The identification module may similarly identify and act upon jobs that include direct access events above some threshold value.

In certain embodiments, the apparatus includes a change module that identifies job that may not benefit from additional setting of the buffer allocation plan. The change module determines a delta value that represents the amount of change in the number and distribution of access events between executions of the same job. The change module may use the data access history to determine the delta value. The change module identifies those jobs with a delta value above some threshold value and directs the plan module to stop setting the buffer allocation plan for future executions of the identified job. The change module may further direct the history module to stop collecting data access information from future executions of the identified job.

The plan module may weight recent data access history more heavily than older data access history. The plan module may also be implemented using a fuzzy logic controller.

Also disclosed is a system for allocating buffers. The system includes index buffers and data buffers for storing data in memory, and a plan module, buffer module, and history module as described above. The system may also include a data store for storing the data access history and a fuzzy logic controller for generating the buffer allocation plan.

Also disclosed is a method implemented on a computer for allocating buffers that involves setting a buffer allocation plan for a job using data access history that is derived from previous executions of the job. The method may also involve increasing the number of index buffers relative to the number of data buffers to improve direct access performance for the portions of job that the buffer allocation plan identifies as a direct access portion and increasing the number of data buffers relative to the number of index buffers to improve sequential access performance for those portions of the job that the buffer allocation plan identifies as a sequential identifies as a sequential access portions.

The method also involves collecting data access information for the current execution of the job and storing the data access information for the current execution of the job in the data access history. The method may also include identifying those jobs that do not benefit from further setting of the buffer allocation plan and excluding the identified jobs from additional setting. These jobs may be executed using the most recent buffer allocation plan.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or known structures, materials, or operations are not shown or described in detail to avoid obscuring aspects of the invention.

A computer readable medium can be any tangible medium capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

An apparatus can be any piece of machinery, device, or tool that performs the functions described in connection with the apparatus. In certain embodiments, the apparatus includes a processor that reads instructions from a computer readable medium. In certain embodiments, the apparatus includes hardware circuits for performing the specified functions. In certain embodiments, the apparatus includes a combination of hardware and instructions stored on a computer readable medium.

Figure 1:
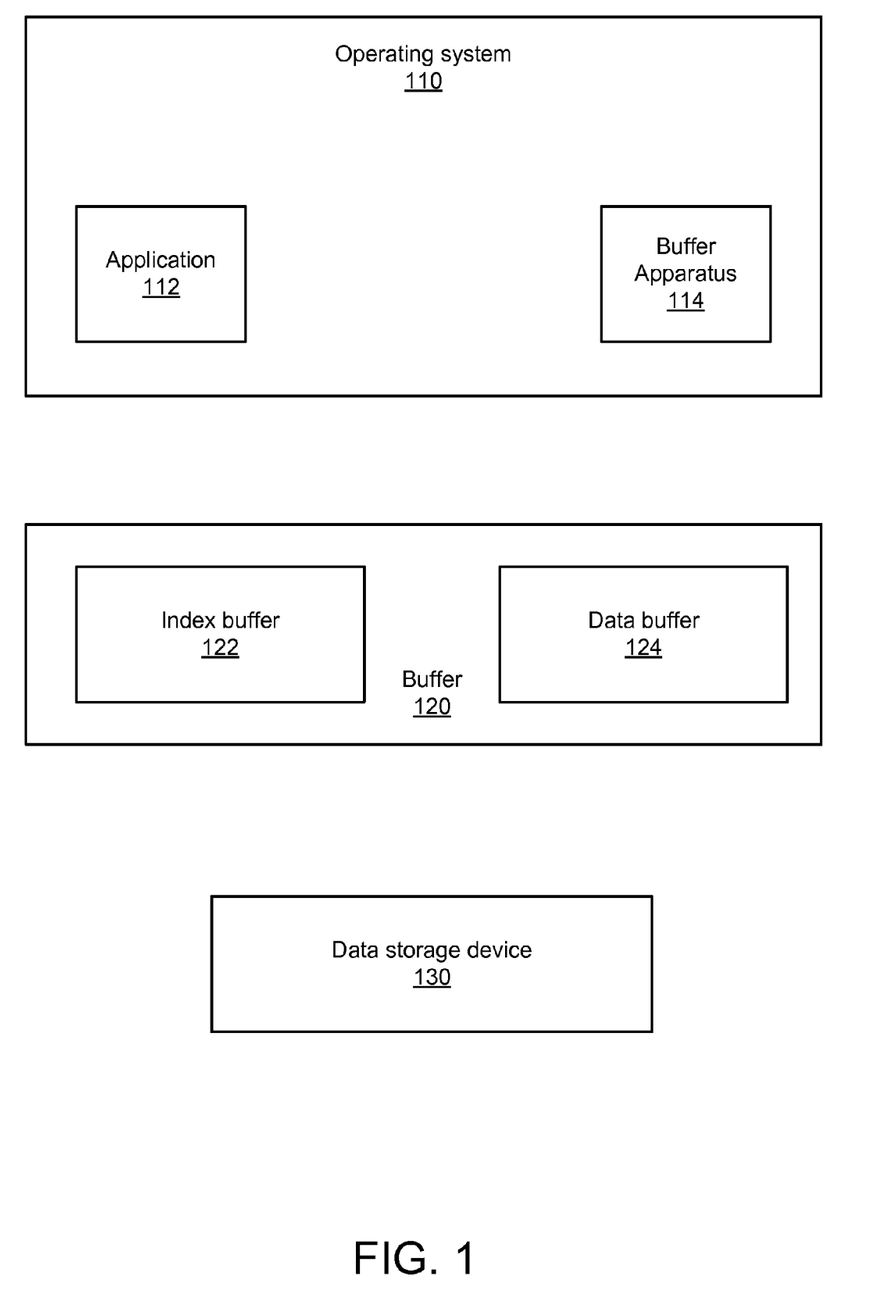
FIG. 1 is a schematic block diagram illustrating one embodiment of a system including a buffer apparatus.

FIG. 1 is schematic block diagram showing an operating system 110, buffer 120, and a DASD 130. In one embodiment, the operating system 110 is a z/OS operating system running in a mainframe environment. However, the operating system 110 may be other another operating system and may run on an server, desktop computer, or other computing device. The operating system 110 includes one or more applications 112 and a buffer apparatus 114.

The application 112 runs on the operating system 110 and requires access to data stored on the data storage device 130. In one embodiment, the application 112 executes jobs to access data on the data storage device 130. The job may read data from the data storage device 130 and/or writes data to the data storage device 130. In one embodiment, the application 112 is application 112 is a batch application. The application 112 may also be an online application.

A job executed by the application 112 may include direct access events and sequential access events. In certain embodiments, the job has a uniform type of access event. In other embodiments, the job is made up of mixed types of access events that vary between direct data access events and sequential data access events. Direct access events are data access requests that use a key or identifier to facilitate accessing the record. VSAM direct access events are one example of direct access events. Sequential access events are data access requests that process records by moving sequentially from one logical record to the next. VSAM sequential access events are one example of sequential access events.

The buffers 120 are a virtual storage area where data read in from, and written out to data storage device 130 can be placed. In one embodiment, the buffers 120 are VSAM buffers where the control interval of a VSAM record is transferred during an I/O operation. The VSAM buffers may be part of a VSAM resource pool. Among other benefits, the buffer 120 offers performance enhancements by reducing the amount of time necessary to access data. In one embodiment, the buffer 120 includes index buffers 122 and data buffers 124. Index buffers 122 store an index component of a record and data buffers 124 store the data component of a record.

Index buffers 122 may be particularly useful for direct access events that require an argument to identify the relevant record. In one embodiment, index buffers 122 are required for each direct access event. In one embodiment, extra index buffers 122 are assigned to jobs that are largely made up of direct access events to contain as much of the index as possible in the index buffers 122. Data buffers 122 may be especially useful for sequential access events sequential access events that read one record after another. In one embodiment, a read ahead operation pulls records into the buffers before they are actually needed by the job when the job is made up of sequential access events. Read ahead operations further improve the performance of the job by anticipating the future data requirements of a job that is largely made up of sequential access events.

The buffer apparatus 114 provides support for buffering operations and helps allocate buffers 120 appropriately for the particular job submitted by an application 112. In one embodiment, the buffer apparatus 114 dynamically increases and decreases the number and the type of buffers 120 during a particular job based on data gathered during previous executions of the job. For example, where a job varies between direct access events and sequential access events, the buffer apparatus 114 may anticipate where the transitions are in the job and re-allocate buffers 120 appropriately while the job is executing. In one embodiment, the buffer apparatus 114 offers performance gains for the system by intelligently and dynamically making real-time buffer 120 allocation decisions.

Figure 2:
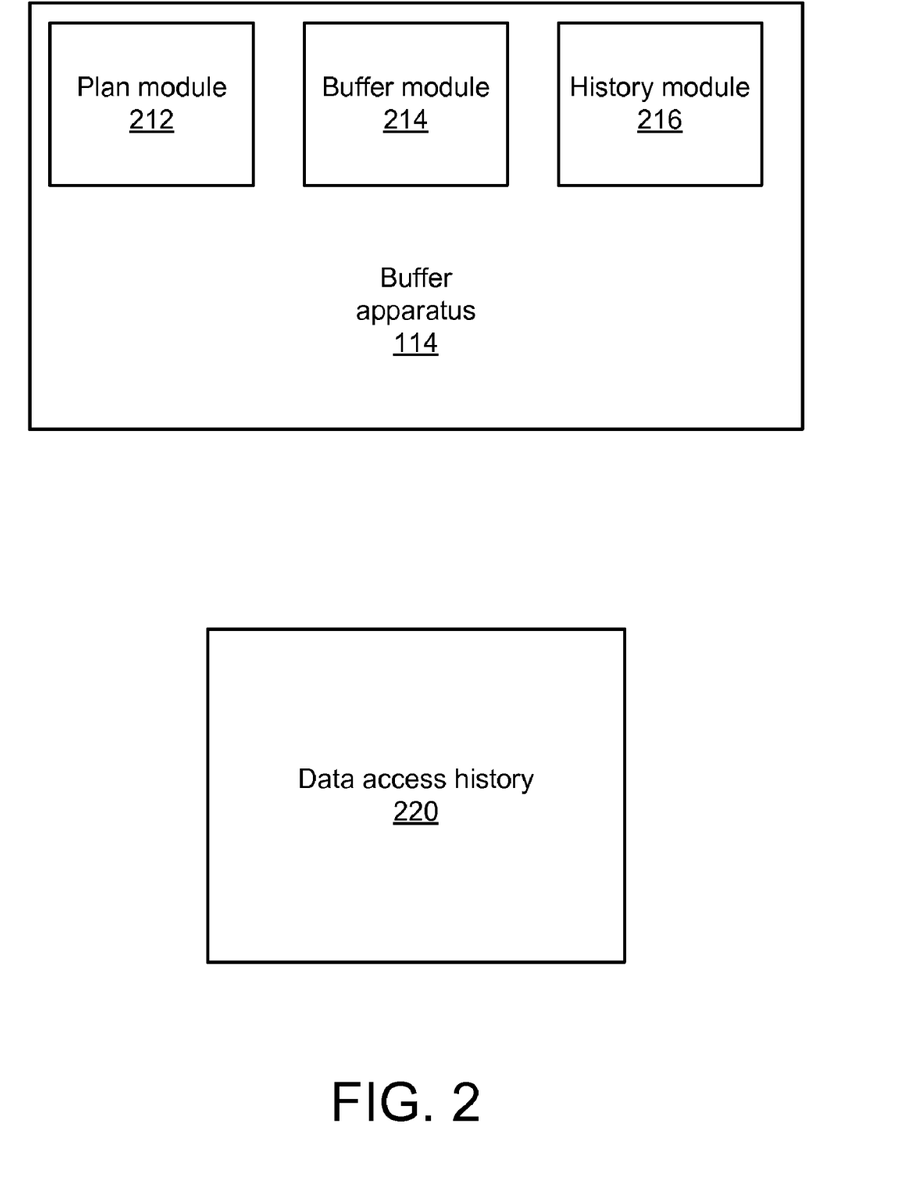
FIG. 2 is a schematic block diagram illustrating one embodiment of a buffer apparatus.

FIG. 2 shows one embodiment of a buffer apparatus 114 for allocating buffers 120 that includes a plan module 212, a buffer module 214, and a history module 216. In one embodiment, the plan module 212 sets a buffer allocation plan for a particular job using data gathered from previous executions of that job. The buffer allocation plan specifies how buffers 120 will be apportioned for the job. In one embodiment, the buffer allocation plan includes the number of buffers 120 that are apportioned for the job. The buffer allocation plan may also specify the type of buffers 120 that are apportioned for the job. In certain embodiments, the buffer allocation plan changes the number of buffers 120 for the job and/or the type of buffers 120 for the job while the job is in progress.

In one embodiment, the buffer allocation plan identifies portions of the job that are historically direct access portions, historically sequential access portions, or some combination of the two. The buffer allocation plan may include direct access portions and sequential access portions that split the job into slices that are specific to either direct or sequential access request processing. For example, a particular job may have a first portion for which 90% of the access requests are direct access requests. A second portion is 70% sequential access requests, and a third portion is 52% direct access requests. The buffer application plan may split the job into three portions as follows: direct access portion; sequential access portion; and direct access portion.

In one embodiment, direct access portions are those segments of the job that historically include a ratio of direct access events to other access events that is above some predefined threshold value. For example, direct access portions may be any portions where more than 50% of the access requests are direct access requests. Similarly, sequential access portions may be those segments of the job that historically include a ratio of sequential access events to other access events that is above some predefined threshold value. In certain embodiments, the buffer allocation plan may also designate certain portions of the buffer allocation plan as balanced access portions if a threshold number of direct access events is not reached and a threshold number of sequential access events is not reached.

In certain embodiments, the buffer allocation plan may also account for how strongly a particular portion is direct access or sequential access. For example, the buffer allocation plan may more aggressively allocate index buffers 122 when the particular portion is 90% direct access in comparison with a portion that is 60% direct access.

Setting a buffer allocation plan may include generating a buffer allocation plan if plan if there is no buffer allocation plan in existence for the job. The plan module 212 may determine, for example, from data access history 220 that the job is a new job. In one embodiment, a user defines the initial buffer allocation plan for the job. In other embodiments, a utility defines the initial buffer allocation plan for the job. Setting a buffer allocation plan may also include adjusting a buffer allocation plan if there is already an existing buffer allocation plan for the job.

As noted above, in one embodiment the plan module 212 sets the buffer allocation plan for the job using data access history 220. In one embodiment, data access history 220 is data about any previous executions of the job. The plan module 212 may determine that a job has no buffer allocation plan if the job has not entries in the data access history 220. In one embodiment, the data access history 220 includes the number and the type of access events. In one embodiment, the data access history 220 includes the number of access events, the number of direct access events, the number of sequential access events, and the distribution of the access events. In one embodiment, the data access history 220 specifies the distribution of direct access events and the distribution of sequential access events throughout the job.

The buffer module 214 allocates buffers 120 during the execution of the job. The buffer module 214 allocates the buffers 120 according to the buffer allocation plan. In one embodiment, the buffer module 214 allocates the buffer 120 to improve direct access performance for those portions of the job that the buffer allocation plan identifiers as direct access portions. The buffer module 214 may, for example, increase the number of index buffers 122 for the direct access portions of the job. The buffer module 214 may also decrease the number of data buffers 124 for direct access portions of the job.

The buffer module 214 may similarly allocate buffers 120 to improve sequential access performance for those portions of the job that the buffer allocation plan identifies as sequential access portions. The buffer module 214 may increase the number of data buffers 124 for sequential access portions of the job and decrease the number of index buffers 122 for the sequential access portions.

The history module 216 collects data access information for the current execution of the job and stores the data access information in the data access history 220. For example, the history module 216 may track the number of access events in the job while the job executes. The history module 216 may also track the number and the distribution of access events as specified by the job. The history module 216 may also track additional data access information specific to the particular execution of the job. For example, the history module 216 may store information such as the amount of time necessary to complete execution of the job, buffer usage and efficiency, or other data access history 220.

The data access history 220 provided by the history module 216 includes data access information from previous executions of jobs. In one embodiment, the data access history 220 includes the type, distribution, and number of data access events. The plan module 212 obtains data access history 220 to aid in setting the buffer allocation plan. The data access history 220 may be stored in a database or other storage construct. In one embodiment, each job has a unique identifier such that data access information for a particular job may be retrieved from the data access history 220.

In certain embodiments, the plan module 212 may weight data access information for a particular job differently. For example, if job A is to be executed, the plan module 212 may retrieve data access information for all previous executions of job A and use that data access information to set the buffer allocation plan for the current execution of job A. The plan module 212 may give more weight to data access information derived from more recent executions of job A than from older executions of job A. In certain embodiments, the plan module 212 may request only data access information from more recent executions of job A. The plan module 212 may also mark old data access information in the data access history 220 for deletion.

Figure 3:
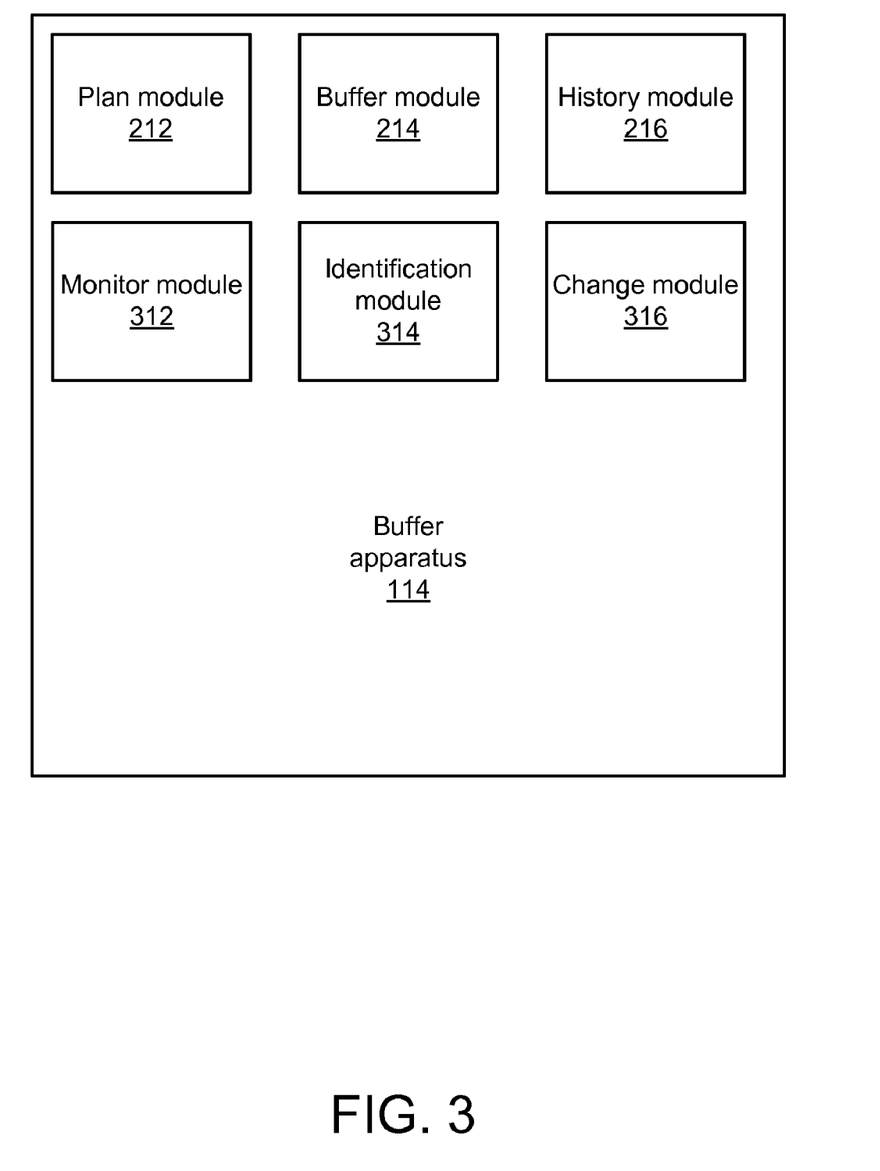
FIG. 3 is a second schematic block diagram illustrating one embodiment of buffer apparatus.

FIG. 3 shows one embodiment of a buffer apparatus 114 that includes a plan module 212, buffer module 214, and history module 216 as described above. The buffer apparatus 114 may also include a monitor module 312, identification module 314, and a change module 316.

The monitor module 312 monitors the job while it is executing and adjusts the buffers while the job is still executing if the monitor module 312 determines that the buffer allocation plan is not optimally allocating the buffers for the current execution of the job. In one embodiment, the monitor module 312 compares a prediction of how the job will execute with how the job is actually executing.

For example, the buffer allocation plan may have been created under the assumption that a particular portion is 90% direct access, with most of the direct access requests at the start of the portion. If the monitor module 312 determines that most of the access requests at the start of the portion during the current execution of the job are sequential, the monitor module 312 may determine that the prediction underlying the buffer allocation plan is incorrect and reduce the number of index buffers 122 from the number of index buffers 122 called for by the buffer allocation plan.

The monitor module 312 may be used to further refine the buffer allocation plan plan and detect significant aberrations between the actual execution of the job and the assumptions about the job that formed the basis of buffer allocation plan. Where there are aberrations, the monitor module 312 can dynamically adjust the allocation of buffers 120 while the job is executing to realize additional performance benefits.

In certain embodiments, the buffer apparatus 114 also includes an identification module 314. The identification module 314 may be used to identify jobs that will not benefit substantially from the plan module 212 continually setting the buffer allocation plan using data access history 220. In one embodiment, the identification module 314 identifies one or more jobs that include sequential access events above a certain threshold and directs the plan module 212 to stop setting the buffer allocation plan for future executions of the identified job. The identification module 314 may also direct the history module 216 to stop collecting data access information for future executions of the job.

For example, if a particular job is 95% sequential access events, there may be little benefit to dynamically allocating buffers during execution. The resources and time spent optimizing the job may be greater than the benefit derived from optimizing the job. As a result, the identification module 314 directs the plan module 212 to cease setting the buffer allocation plan for the job and directs the history module 216 to stop collecting data access information for executions of the job.

Similarly, the identification module 314 may be configured to identify those jobs that include direct access events above a certain threshold value. The identification module 314 may direct the plan module 212 to stop setting the buffer allocation plan for future executions of the job and direct the history module 216 to stop collecting data access information for future executions of the identified jobs.

In certain embodiments, the identification module 314 considers not only the amount of a particular access event, but also a distribution of the particular access events. For example, a job may by 95% sequential access events, but if the other access events (such as direct access events) are not evenly distributed, dynamic buffer allocation may still be of value. However, if the other access events are distributed throughout the job, dynamic buffer allocation may be of little benefit.

In one embodiment, the identification module 314 identifies those jobs that will not benefit from additional setting of the buffer allocation plan by using data access history 220. In certain embodiments, the identification module 314 only identifies jobs that will not benefit from additional setting of the buffer allocation plan after the jobs run at least one time. In certain embodiments, future executions of jobs that have been so identified are executed using the last buffer allocation plan that was set for the job.

In certain embodiments, the user can reactivate the plan module 212. In other embodiments, the identification module 314 stops the plan module 212 and the history module 216 for the job for a specified number of runs executions, then restarts them in order to verify that dynamic allocation is not needed.

The identification module 314 may stop the plan module 212 and history module 216 again following verification.

In one embodiment, the buffer apparatus 114 also includes a change module 316 that determines how data access event patterns vary from one execution of a job to the next for the same job. If the data access event patterns vary only slightly, the change module 316 may determine that the job is relatively predictable and stop future attempts at setting the buffer allocation plan and collecting data access information for the job. For certain stable jobs, any improvements in performance resulting from further refinements to the buffer allocation plan allocation plan may not justify the cost of setting the buffer allocation plan.

In certain embodiments, the change module 316 reduces the frequency with which the plan module sets the buffer allocation plan. For example, the change module 316 may identify a particular job as being relatively stable and instructs the plan module 212 to set the buffer allocation plan on only every third execution of the job. The change module 316 may similarly instruct the history module 216 to gather data access information for only every third execution. In other embodiments, the change module 316 stores performance parameters for the stable job (such as time of execution, buffer usage information, etc) and stops the plan module 212 from setting the buffer allocation plan until the change module 316 sees a significant reduction in performance.

In one embodiment, the change module 316 determines a delta value that represents the amount of change in the number and distribution of access events from one execution of the job to the next. The change module 316 may use the data access history 220 to determine the delta value. The change module 316 identifies one or more jobs with a delta value above a threshold value and directs the plan module 212 to stop setting the buffer allocation plan for future executions of the identified job. The change module 316 may further direct the history module 216 to stop collecting data access information for future executions of the identified jobs.

Figure 4:
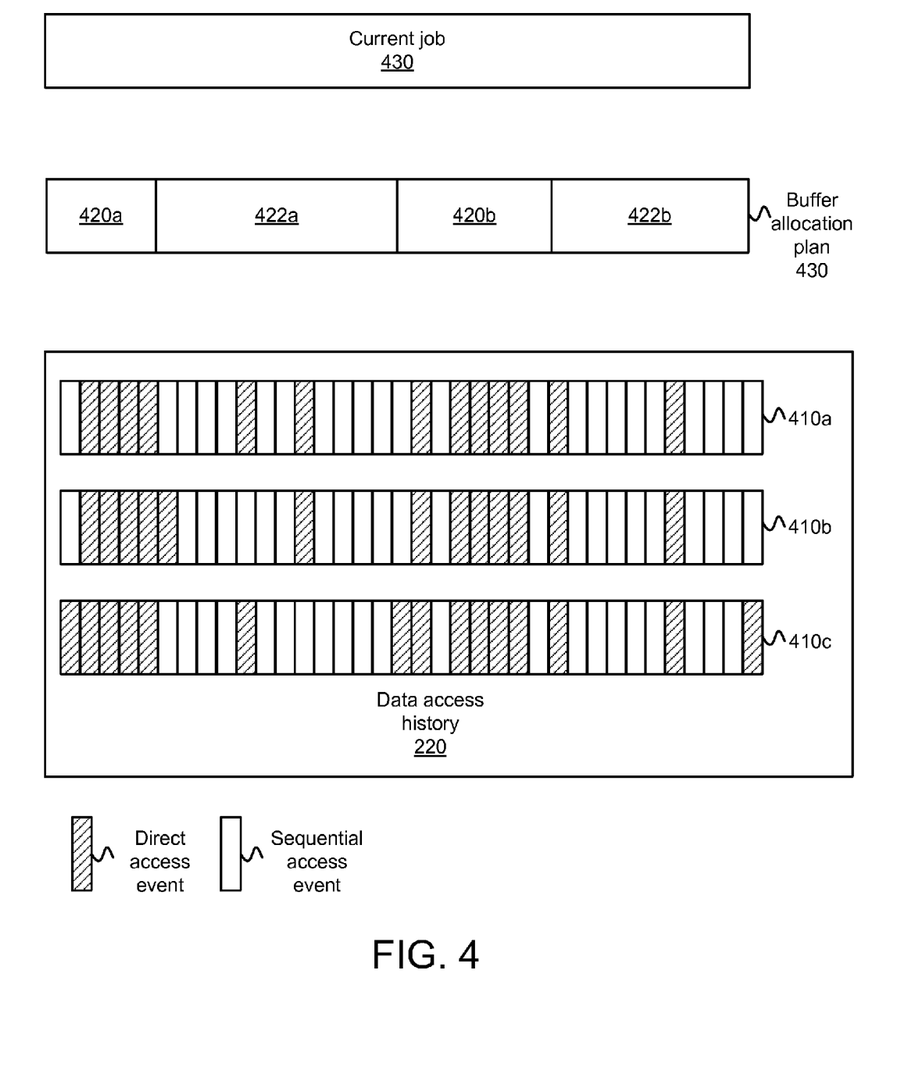
FIG. 4 is a schematic block diagram illustrating one embodiment of data access history and a corresponding buffer allocation plan.

FIG. 4 is a schematic block diagram illustrating an exemplary illustration of a buffer allocation plan 430 created using data access history 220 for a current job 430. The data access history 220 includes data access information 410a-c from previous executions of the current job 430. As indicated by the legend below, the striped blocks represent direct access events while the blank blocks represent sequential access events. In the depicted embodiment, embodiment, both the type and distribution of data access events are recorded in the data access history 220. As noted above, the data access history 220 may store different data access information in certain embodiments.

The plan module 212 sets a buffer allocation plan 430 for the current job 430 using the data access history 220 that is derived from previous executions of the job. In certain embodiments where the data access history 220 has no data access information 410 for the particular job, setting the buffer allocation plan 430 involves the plan module 212 generating a buffer allocation plan 430. Where, as here, there is data access information 410 derived from previous executions of the current job 430, the plan module sets the buffer allocation plan using the data history 220. In one embodiment, where the data access events are VSAM data access events, the request parameter list of a VSAM data set can be used to extract the type of request (whether direct, sequential, or other) and store that information in the data access history 220.

In one embodiment, the plan module 212 splits the job into slices that are direct access portions 420 and sequential access portions 422. In one embodiment, the plan module 212 divides the job into equal segments and then determines which segments are direct access portions 420 and which are sequential access portions 422. For example, if the job has historically included five-thousand requests, the plan module 212 may divide the job into five portions, determine the proportion of direct access events to sequential access events in each portion, and construct a buffer allocation plan for the current job 430 accordingly.

In other embodiments, the plan module 212 finds sections of the job that involve high concentrations of a certain request type. For example, as shown in FIG. 4, the plan module 212 determines that, in previous executions of the job, there is a high concentration of direct access events in the first five access events. The plan module 212 determines that the first portion includes five access events and is a direct access portion 420a. The plan module 212 makes similar determinations and designates the direct access portions 420 and the sequential access portions 422 as shown in the buffer allocation plan 430. In one embodiment, for areas where there is no high concentration of either type of data event, the plan module 212 designates the area a balanced access portion.

In other embodiments, the plan module 212 may allocate portions based on time rather than the number of access events. For example, the plan module 212 may determine that in the first ten seconds, 90% of the activity is direct access activity and identify this as the direct access portion 420a. The plan module 212 may make similar determinations about the other portions of the job and appropriately designate them until the entire job is partitioned.

In one embodiment, after the plan module 212 apportions the full length of the job, the plan module 212 looks at the specific number and types of events in those portions. The plan module 212 may then use the number and type of events to define how buffers are actually allocated. The current job 430 is then executed using the allocation defined by the buffer allocation plan 430.

In one embodiment, the plan module 212 is a fuzzy logic controller and generates the buffer allocation plan 430 using fuzzy logic. For example, the plan module 212 may look at the number and type of access events in the various portions of the job and uses the number and the number and type to define two fuzzy membership functions. In one embodiment, the fuzzy membership functions denote three or more states correlating to the level of activity. Each state in the membership function has a shape that defines the domain and range of the membership function. The combined shape of the states defines the membership function across the full range of the job and maps to the required adjustments to the number of buffers and the type of buffers.

Figure 5:
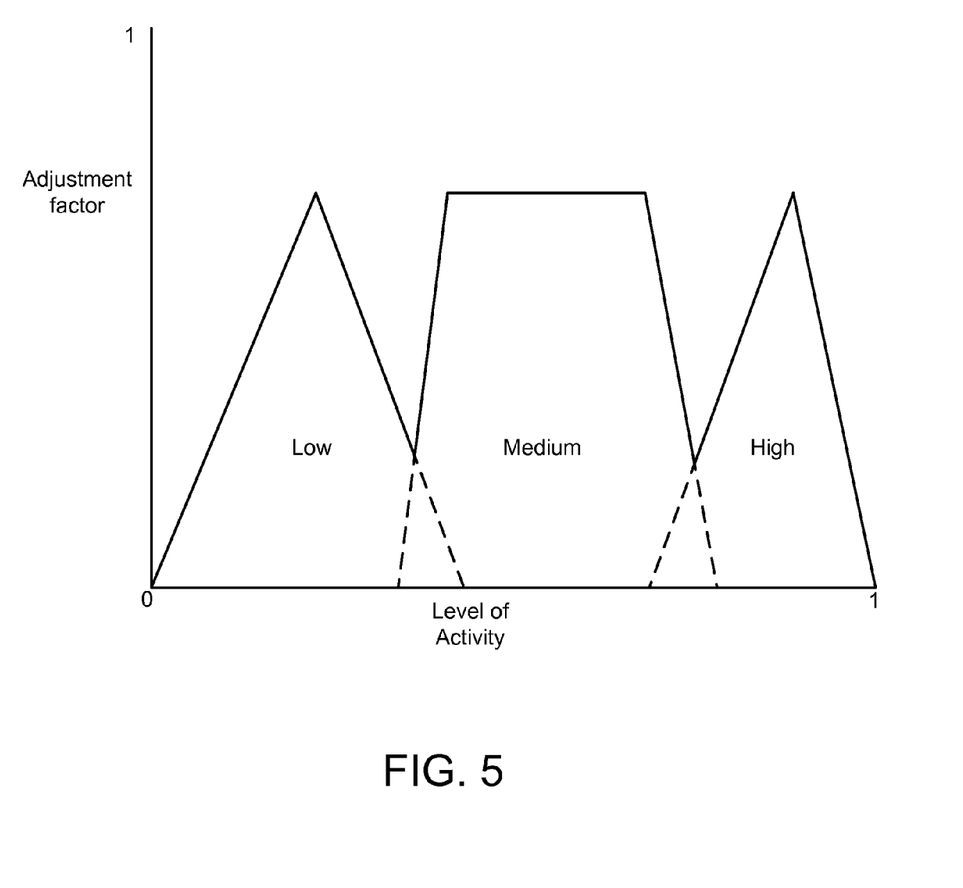
FIG. 5 is a schematic block diagram illustrating one embodiment of a membership function that may be used to create a buffer allocation plan.

For example, FIG. 5 shows one example of a fuzzy membership function where, as input loses value in one area, it gains value in another. As the rank in "low" decreases, rank in "medium" increases. In one embodiment, there is one membership function for direct access events and one for sequential access events. If the portions of the job are made based on time, even if the time for the first direct access portion and the second sequential portion are the same (for example, ten seconds), the number of requests may be different. For example, the first direct access portion may include five thousand access events, while the second sequential access portion may include twenty thousand access events even though both are ten seconds long. As a result, the adjustment factor may need to be higher for the second sequential access portion.

Continuing the example, the plan module 212 would use the direct access membership function for the first direct access portion, while the sequential access membership function would be used for the second sequential access portion. Referring to FIG. 5, the low activity state would be invoked for the direct access portion, while the high activity state would be invoked for the sequential access portion. Thus, in the above example, the adjustment to the buffers would be smaller for the direct access portion than that for the sequential access portion.

The plan module 212 may, however, also be implemented using approaches other than fuzzy logic as explained above. For example, the plan module 212 may determine the buffer allocation plan based on a neural-network model, using select statements, or other approach. The above example using a fuzzy logic implementation is only one example of a possible implementation of the plan module 212.

Figure 6:
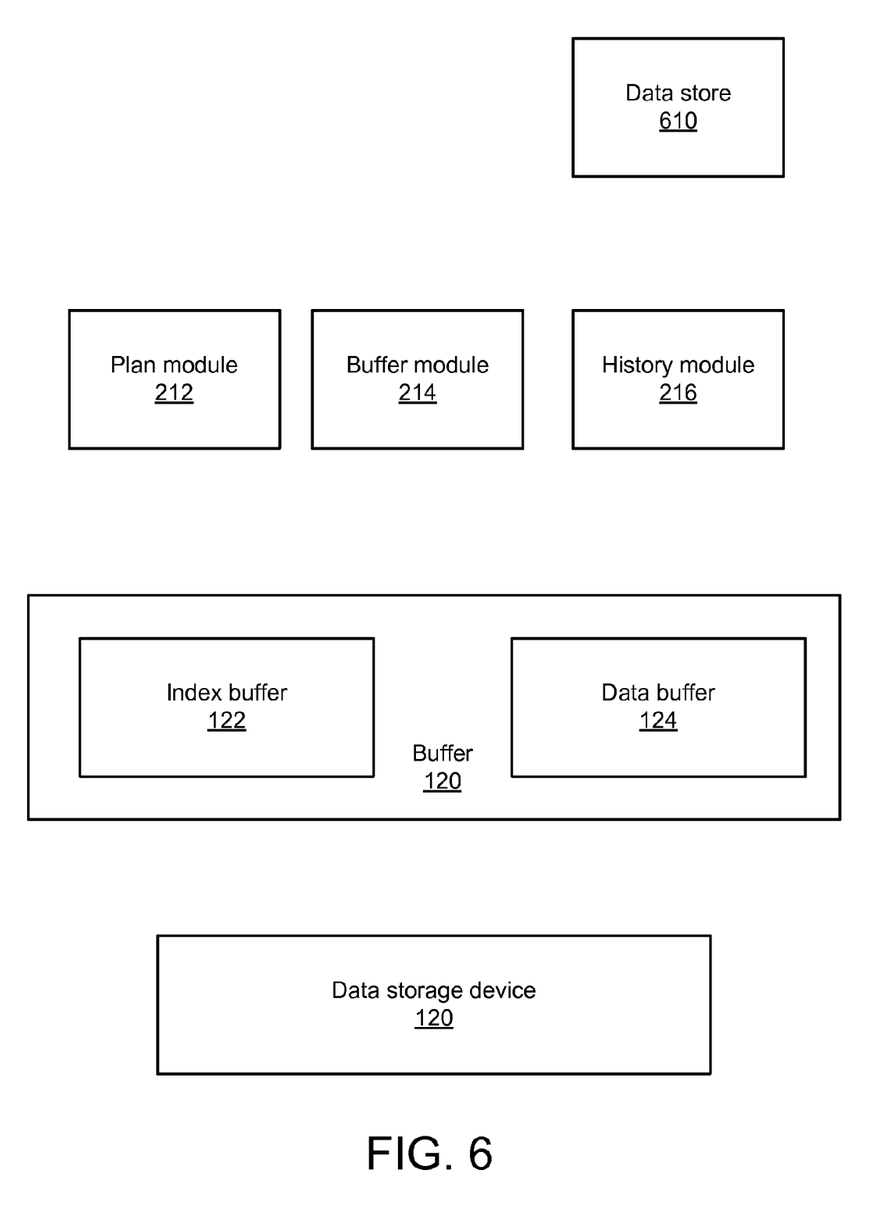
FIG. 6 is a schematic block diagram illustrating one embodiment of a system for allocating buffers.

FIG. 6 shows an illustrative schematic block diagram of a system for allocating buffers 120 for jobs that require data access. The buffer 120 includes index buffers 122 and data buffers 124 for storing data in memory. The buffers 120 may be used to hold data that is being read from, and written to, the data storage device 120.

The system also includes a data store 610, a plan module 212, a buffer module 214, and a history module 216. Although these components are shown separately to emphasize their role, they need not be physically separate. In one embodiment, the data store 610 and the modules reside partially or wholly on the data storage device 120.

The plan module 212 sets a buffer allocation plan for a job using data access history stored in the data store 610. The data access history is derived from previous executions of the job and may include the number and distribution of direct access events, and a number and distribution of sequential access events. The data store 610 may store data access history for a plurality of different jobs.

The buffer module 214 allocates the buffers during the execution of the job according to the buffer allocation plan. The buffer module 214 may, for example, increase the number of index buffers 122 for those portions of the job that the buffer allocation plan identifies as direct access portions, and increase the number of data buffers 124 for those portions of the job that the buffer allocation plan identifies as sequential access portions.

The history module 216 collects data access information for the current execution of the job and stores the data access information in the data access history.

Figure 7:
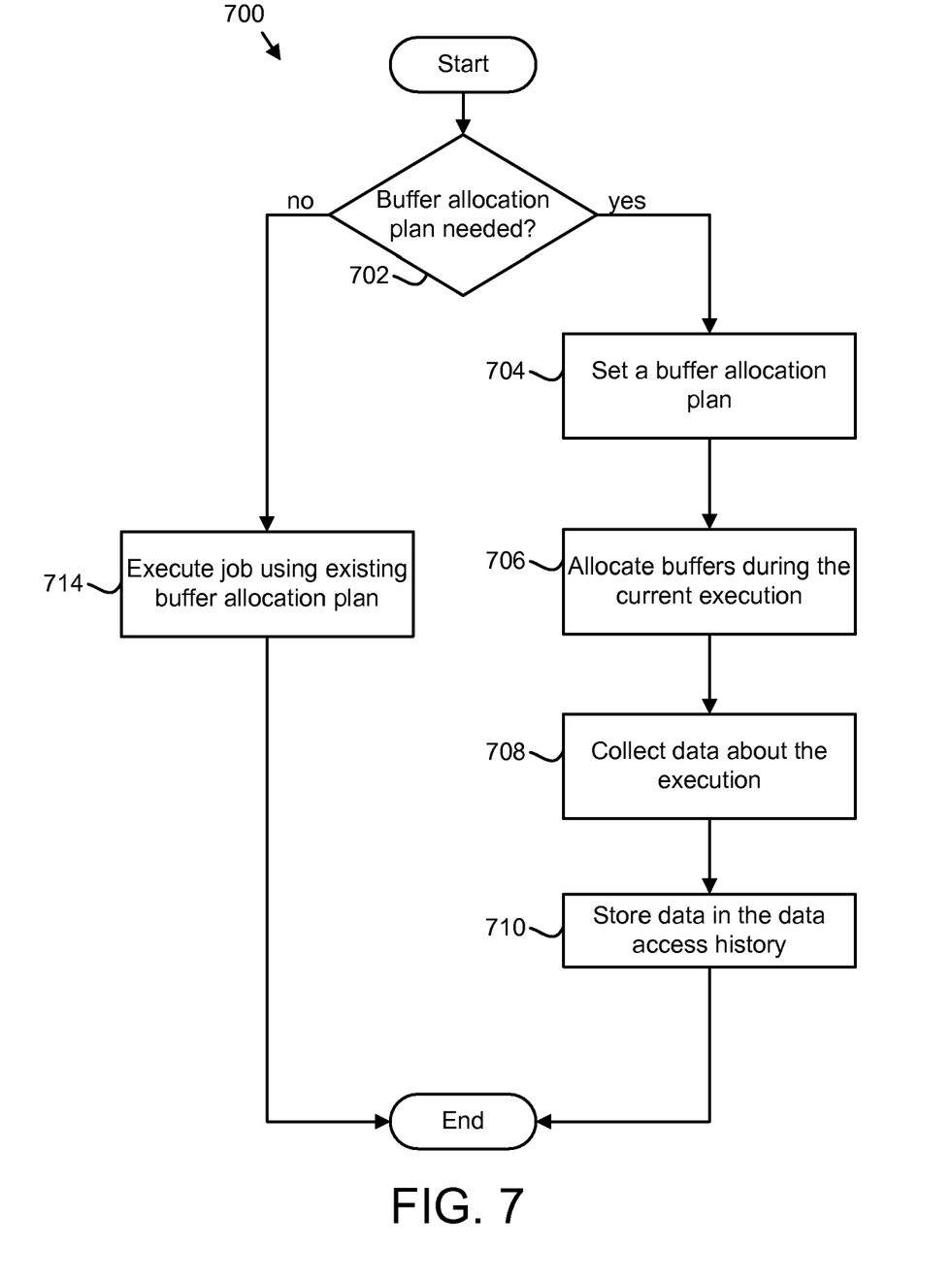
FIG. 7 is a schematic flow chart diagram illustrating one embodiment of a method for allocating buffers during execution of a job.

FIG. 7 shows a method 700 for dynamically allocating buffers for a job during execution. In certain embodiments, this method is implemented by computer readable program code that is stored on a computer useable medium. The method begins with the plan module 212 determining 702 if a buffer allocation plan must be set for the job to be executed. In certain embodiments, the plan module 212 determines that a buffer allocation plan does not need to be set if the identification module 314 or change module 316 have determined that the job will not sufficiently benefit from setting the buffer allocation plan to merit the additional overhead. If the buffer allocation plan does not need to be set, the job is executed 714 using an existing buffer allocation plan.

If the buffer allocation plan does need setting, the plan module 212 sets 704 the buffer allocation plan using data access history from previous executions of the job. The job is then executed, and the buffer module 214 allocates 706 buffers during the execution of the job according to the buffer allocation plan. Allocating buffers, in certain embodiments, involves increasing the number of index buffers relative to the number of data buffers in order to improve direct access performance for those portions of the job that the buffer allocation plan identifies as direct access portions. Allocating buffers may also involve increasing the number of data buffers relative to the number of index buffers in order to improve sequential access during those portions of the job that the buffer allocation plan identifies as sequential access portions.

In certain embodiments, a monitor module 312 monitors the job while it is executing and adjusts the buffers while the job is still executing if the monitor module 312 determines that the buffer allocation plan is not optimally allocating the buffers. The monitor module 312 may compare a prediction of how the job will execute with how the job is actually executing. Where there are aberrations, the monitor module 312 can dynamically adjust the allocation of buffers 120 while the job is executing to realize additional performance benefits.

A history module 216 collects 708 data access information for the current execution of the job and stores 710 that data access information in the data access history. The data access information is thus available to the plan module 212 in future adjustments to the buffer allocation plan, and is also available to aid in determining whether or not future adjustments to the buffer allocation plan are necessary.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for allocating buffers, the apparatus comprising:
  a plan module configured to set a buffer allocation plan for a job using a data access history about previous executions of the job, wherein the data access history comprises a number and a distribution of direct access events and a number and a distribution of sequential access events;
  a buffer module configured to allocate buffers during a current execution of the job according to the buffer allocation plan, wherein allocating the buffers comprises:
    allocating buffers to improve direct access performance for one or more portions of the job that the buffer allocation plan identifies as a direct access portion;
    allocating buffers to improve sequential access performance for one or more portions of the job that that the buffer allocation plan identifies as a sequential access portion; and
  a history module configured to collect data access information for the current execution of the job and to store the data access information in the data access history.

2. The apparatus of claim 1, wherein allocating buffers to improve direct access performance comprises increasing a number of index buffers.

3. The apparatus of claim 1, wherein allocating buffers to improve sequential access performance comprises increasing a number of data buffers.

4. The apparatus of claim 1, wherein the buffer allocation plan comprises one or more direct access portions and one or more sequential access portions.

5. The apparatus of claim 4, wherein the direct access portion is a segment of the job that historically has a ratio of direct access events to other access events that is above a predefined threshold value.

6. The apparatus of claim 4, wherein the sequential access portion is a segment of the job that historically has a ratio of sequential access events to other access events that is above a predefined threshold value.

7. The apparatus of claim 1, further comprising a monitor module that monitors the current execution of the job during execution of the job and adjusts one or more buffers during execution of the job.

8. The apparatus of claim 1, further comprising an identification module configured to:
   identify one or more jobs that comprise sequential access events above a threshold value;
   direct the plan module to stop setting the buffer allocation plan for one or more future executions of the identified job; and
   direct the history module to stop collecting data access information for one or more future executions of the identified job.

9. The apparatus of claim 1, further comprising an identification module configured to:
   identify one or more jobs that comprise direct access events above a threshold value;
   direct the plan module to stop setting the buffer allocation plan for one or more future executions of the identified job; and
   direct the history module to stop collecting data access information for one or more future executions of the identified job.

10. The apparatus of claim 1, further comprising a change module configured to determine a delta value representing the amount of change in number and distribution of access events between executions of the same job, wherein the change module uses the data access history to determine the delta value.

11. The apparatus of claim 10, the change module further configured to:
   identify one or more jobs with the delta value above a threshold value;
   direct the plan module to stop setting the buffer allocation plan for one or more future executions of the identified job; and
   direct the history module to stop collecting data access information for one or more future executions of the identified job.

12. The apparatus of claim 1, wherein the plan module weights recent data access history more heavily than older data access history.

13. The apparatus of claim 1, wherein the plan module is implemented using a fuzzy logic controller.

14. A system for allocating buffers, the system comprising:
   a plurality of buffers comprising one or more index buffers and one or more data buffers for storing data in memory;
   a plan module configured to set a buffer allocation plan for a job using a data access history about one or more previous executions of the job, wherein the data access history comprises a number and a distribution of direct access events and a number and a distribution of sequential access events;
   a buffer module configured to allocate buffers during a current execution of the job according to the buffer allocation plan, wherein allocating the buffer comprises:
      increasing a number of index buffers for one or more portions of the job that the buffer allocation plan identifies as a direct access portion;
      increasing a number of data buffers for one or more portions of the job that the buffer allocation plan identifies as a sequential access portion; and
   a history module configured to collect data access information for the current execution of the job and to store the data access information in the data access history.

15. The system of claim 14, further comprising a data store for storing the data access history.

16. The system of claim 14, further comprising a fuzzy logic controller.

17. A computer program product, comprising a non-transitory computer useable medium having a computer readable program code embodied therein, said computer readable program code configured to be executed to implement a method for allocating buffers, said method comprising:
   setting a buffer allocation plan for a job using a data access history derived from one or more previous executions of the job, wherein the data access history comprises a number and a distribution of direct access events and a number and a distribution of sequential access events;
   allocating buffers during a current execution of the job according to the buffer allocation plan, wherein allocating the buffer comprises:
      increasing a number of index buffers relative to a number of data buffers to improve direct access performance for one or more portions of the job that the buffer allocation plan identifies as a direct access portion;
      increasing the number of data buffers relative to the number of index buffers to improve sequential access performance for one or more portions of the job that the buffer allocation plan identifies as a sequential access portion;
   collecting data access information for the current execution of the job; and storing the data access information for the current execution of the job in the data access history.

18. The computer program product of claim 17, the method further comprising identifying one or more jobs that do not benefit from further setting of the buffer allocation plan and excluding the identified one or more jobs from additional setting of the buffer allocation plan.

19. The computer program product of claim 18, the method further comprising executing the identified job using a most recent buffer allocation plan.

20. The computer program product of claim 17, wherein the buffer allocation plan comprises one or more direct access portions and one or more sequential access portions.

* * * * *